United States Patent [19]

O'Hara, Jr. et al.

[11] Patent Number: 5,483,566
[45] Date of Patent: Jan. 9, 1996

[54] METHOD AND APPARATUS FOR MODIFYING THE CONTENTS OF A REGISTER VIA A COMMAND BIT

[75] Inventors: Robert B. O'Hara, Jr., Los Altos; David G. Roberts, Fremont, both of Calif.

[73] Assignee: Advanced Micro Devices, Inc., Sunnyvale, Calif.

[21] Appl. No.: 469,605

[22] Filed: Jun. 6, 1995

Related U.S. Application Data

[63] Continuation of Ser. No. 171,313, Dec. 21, 1993, abandoned.

[51] Int. Cl.[6] ............................................. G11C 19/00
[52] U.S. Cl. ........................... 377/73; 377/77; 377/78; 377/55
[58] Field of Search ............................. 377/73, 77–78, 377/58

[56] References Cited

U.S. PATENT DOCUMENTS 4,175,284  11/1979  Shuraym ................................. 364/200
5,150,389   9/1992  Kawasaki ................................. 377/78
5,280,202   1/1994  Chan et al. ............................. 307/243

FOREIGN PATENT DOCUMENTS 0114683  1/1984  European Pat. Off. .......... G06F 9/30
0496002  8/1991  European Pat. Off. .......... G06F 9/30

OTHER PUBLICATIONS

IBM Technical Disclosure Bulletin, vol. 30, No. 12, May, 1988 pp. 402–405.

Primary Examiner—Margaret Rose Wambach
Attorney, Agent, or Firm—Benman Collins & Sawyer

[57] ABSTRACT

A method and apparatus as provided that simplifies the software required for modifying the contents of a register. By adding one gate to the register, a single command can be written to the register to modify the states of multiple bits. The system reduces software overhead significantly when multiple registers must be modified.

5 Claims, 4 Drawing Sheets

METHOD AND APPARATUS FOR MODIFYING THE CONTENTS OF A REGISTER VIA A COMMAND BIT

This is a continuation of application Ser. No. 08/171,313 filed on Dec. 21, 1993 now abandoned.

FIELD OF THE INVENTION

The present invention relates generally to the field of data logic devices and more particularly to data logic devices that include control registers.

BACKGROUND OF THE INVENTION

In many applications, data logic devices are utilized to transfer information from one point to the next, for example, these logic devices are utilized to connect devices on a network such as two processors. In other instances they may be utilized within a system to facilitate movement of data from one point within the system to another. Such devices utilize registers therewith to facilitate the movement and modification of data within such devices. Typically these registers interact with software for the necessary modification of the data.

The following sequence of software steps are necessary in the prior art to provide a new command in the register:

READ REGISTER

SAVE A COPY OF THE REGISTER CONTENTS

MASK OFF THE PART OF THE CONTENTS TO BE RETAINED

MODIFY THE REGISTER CONTENTS

COMBINE THE MODIFIED PART WITH THE RETAINED PART

WRITE REGISTER

These steps take a significant amount of time and must be done a plurality of times when registers are connected in cascade.

Hence, there is along felt but unsatisfied need for a system which is less complex than prior art systems and at the same time, is able to provide a significant increase in the speed of execution of the register. In addition, the system should be one that will reduce the software complexity of the system. Finally, the system should be one that adds minimal cost to the hardware. The present invention addresses such a need.

SUMMARY OF THE INVENTION

The present invention discloses an apparatus and a method that reduce the size and complexity of software that must interface with or control hardware. The present invention accomplishes this through a novel approach to the command and/or control registers of the hardware.

The present invention is concerned with the provision of an apparatus for modifying the contents of a register. The register includes a plurality of register bits and each register bit includes an input terminal and an output terminal. Each register bit has a logic high state and a logic low state. The apparatus of the present invention includes a plurality of multiplexer means and a plurality of logic means.

Each multiplexer means includes a first input terminal, a second input terminal, a control terminal and an output terminal. The first input terminal is coupled to receive a command bit which has a logic state equal to a new logic state of those register bits that are to be modified. The second input terminal is coupled to the output terminal of one of the plurality of register bits for receiving the logic state of the register bits. The output terminal is coupled to the input terminal of the register bits for modifying the logic state of the register bits.

Each logic means includes a first input terminal and an output terminal. The first input terminal is coupled to receive a plurality of mask bits which identifies if one of the plurality of register bits is to be modified to the new logic state. The output terminal is coupled to the control terminal of the multiplexer means for controlling the multiplexer means so that if the register bit is identified by the mask bit as one that is to be modified to the new logic state, the output of the multiplexer will modify the register bit to the new logic state as determined by the logic state of the command bit.

The present invention is also concerned with the provision of a method for modifying the content of a register. The register includes a plurality of register bits. Each register bit has a logic high state and a logic low state. The method includes the steps of (a) creating a mask of the register bits that are to be modified to a new logic state; (b) creating a command bit which has a logic state equal to that of the new logic state; and (c) writing the logic state of the command bit to the masked register bits so that the masked register bits are modified to the new logic state.

DETAILED DESCRIPTION

The present invention relates to an improvement in a register within a data logic device. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
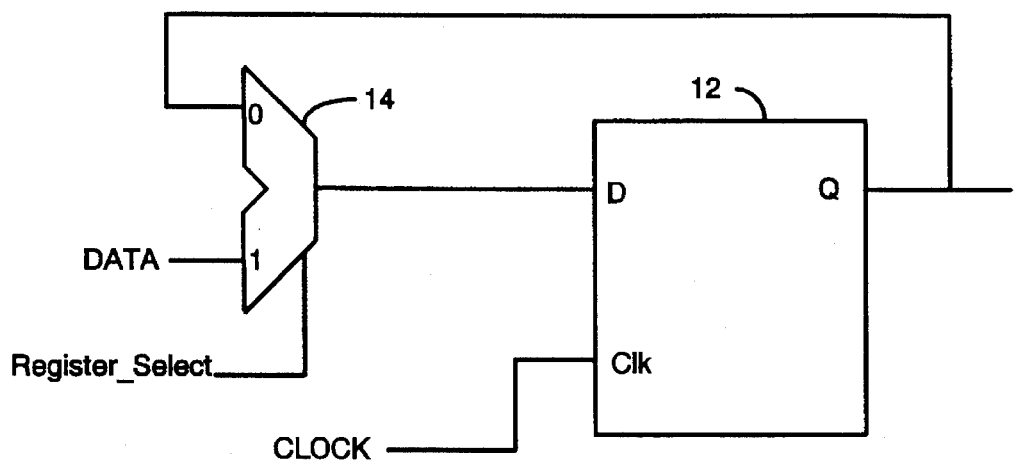
FIG. 1 is a block diagram of an embodiment of a prior art command register.

An embodiment of a hardware control register 10 in accordance with the prior art is shown in FIG. 1. Referring to FIG. 1, the prior art register includes a register bit as implemented by a D-type flip-flop 12 coupled to a multiplexer 14. The implementation of the register bit using a D-type flip-flop is for illustration purpose only. The register bit may be implemented by any means capable of storing a logic state. The multiplexer 14 receives a data in signal and a feedback signal from the flip-flop 12. A register select signal steers one of the multiplexer 14 inputs to the flip-flop 12. A masking step is provided for by software prior to providing the data in signal. The masking step indicates which part of the register must be changed and is part of the data in signal. This data in signal must be provided to each register in a cascade and can require a significant amount of software overhead. Previously, when software needed to change the state of hardware, the software had to have access to the current state of the hardware.

Figure 2:
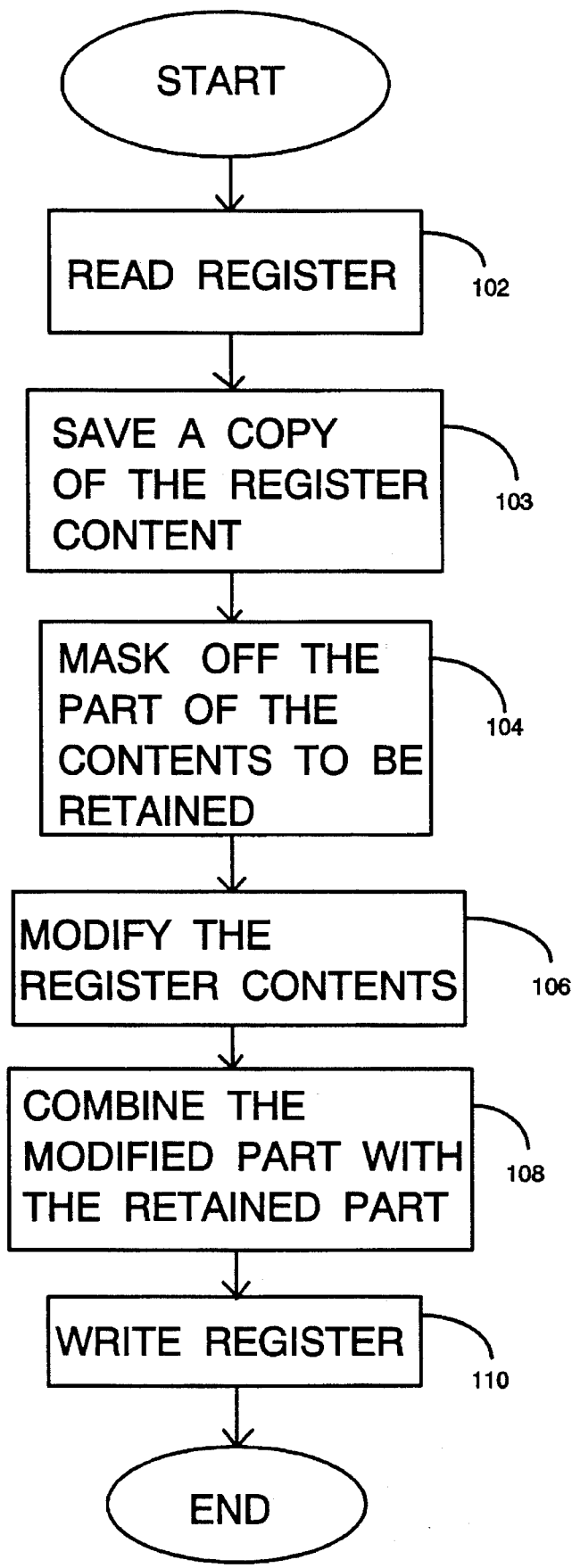
FIG. 2 is a flow chart of a software routine for use with the register of FIG. 1.

This is particularly true when the hardware may have more than one independent block controlled through multiple fields in a single register. In this case, the software must know the state of each independent block and change the state of only a subset of those blocks while leaving the remainder unmodified. An example of the prior art routine is shown in FIG. 2 in flow chart form. Referring now to FIG. 2, the current state of the hardware is first read via step 102. The current state may be in a memory location or in a register in the hardware. Then, a copy of the current state is saved via step 103. Next, the part of the register contents to be retained is masked off via step 104. Thereafter, the register contents are changed to the desired new state, via step 106. Then, the modified part of the register contents is combined with the retained part of the register contents via step 108. Finally, the new state is written to the command and/or control register 10 of the hardware via step 110.

As can be seen from this example, four of the six steps above are required so that the portions of the command and/or control register that need to be preserved are not modified when the new state information is written to the hardware. To ensure that the register contents are current, the entire sequence of instructions above must be executed without the possibility of interruption. This may require that interrupts of a processor or the like be disabled for the period when these instructions execute. This requirement leads to added complexity and a large number of instructions. Additionally, these steps take a significant amount of time and must be done a plurality of times when registers are connected in cascade.

The present invention changes the way that hardware is controlled so that all of the command and/or control information does not need to be written to the hardware at the same time. The present invention allows only that information that needs to be modified to be written to the hardware. Through the use of the present invention, the hardware maintains the current register contents internal to the register and this information is not required by the software to modify the state of the hardware. A critical feature of the present invention is the use of a command bit through which the software informs the hardware of the type of modification to make to the register contents.

In the present invention, a Mask_Bit selects those register bits that are to be changed and a Command_Bit defines what the final state of the register bit will be. The Mask_Bit and the Command_Bit may both be part of the Action_Mask that is written to the command and/or control register or they may be separate. If they are separate, the Command_Bit may be generated through the address decode of the register to be written or through an instruction decode of a separate set of inputs.

Figure 4:
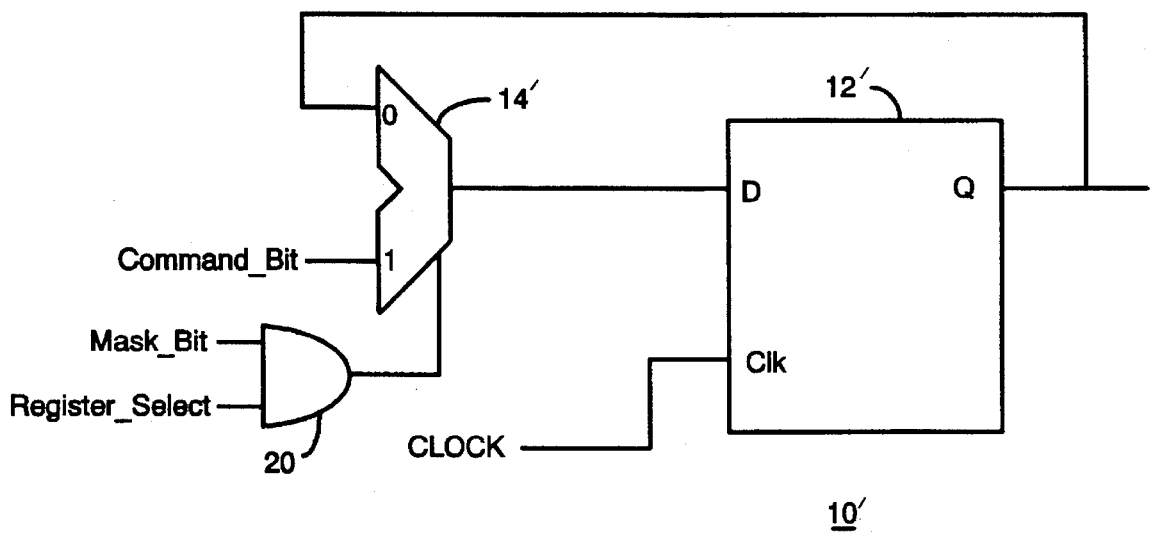
FIG. 4 is a block diagram of an embodiment of a command register in accordance with the present invention.
Figure 3:
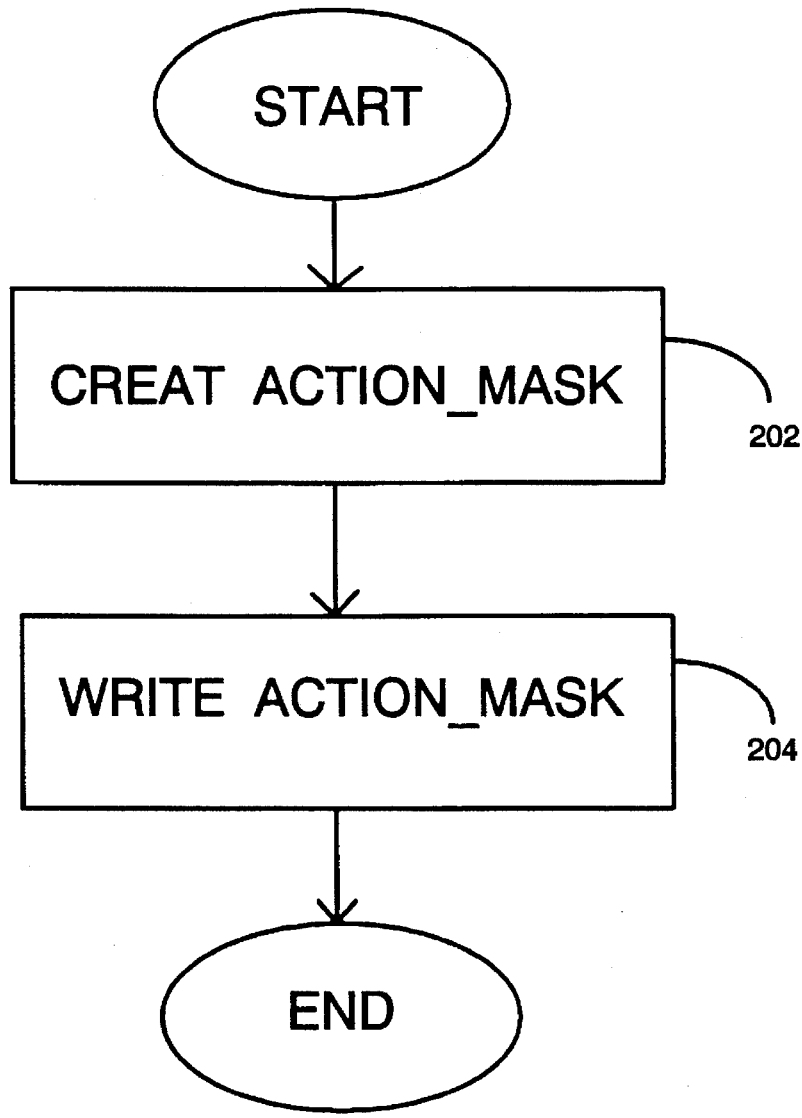
FIG. 3 is a flow chart of a software routine for use with a command register in accordance with the present invention.

To more clearly explain the operation of the present invention, refer now to FIGS. 3 and 4 which is a software flow chart and a control register in accordance with the present invention. The following pseudo-code segment flow chart of FIG. 3 illustrates the same function as shown in the prior art flow chart of FIG. 2. Referring now to FIG. 3, a mask of the bits is created in the registered contents that must be changed with the command bit for the desired action, via step 202. Thereafter, the information required to the command and/or control register is written that will change the current register contents to the desired new state, via step 204.

As this Figure shows, only two instructions are required to perform the same operation that required six instructions previously. This reduces the complexity of this portion of a software program and increases the speed of its operation. Because the,re is only a single access to the hardware, writing the Action_Mask, there is no need to disable interrupts. This reduces the complexity even further.

The present invention requires only a very slight change to the implementation of the command and/or control register of the hardware, consisting of as little as one gate per bit. The setting of a command bit indicates which bits within the register are to be changed by the mask. By modifying the register (adding one gate), software use can be significantly reduced.

Referring now to FIG. 4, what is shown is a command register 10' in accordance with the present invention. The register 10' includes a register bit as implemented by a D-type flip-flop 12' coupled to a multiplexer 14'. The implementation of the register bit using a D-type flip-flop in this embodiment is for illustration purpose only. The register bit may be implemented by any means capable of storing a logic state without departing from the scope and spirit of the present invention. As is seen, the major difference is the AND gate 20 which is coupled to tile multiplexer 14' and receives a MASK_BIT input and a REGISTER_SELECT input.

The command register 10' of the present invention as shown in FIG. 4 logically "ANDs" the masking signal to the select signal via AND gate 20 and utilizes a command bit at the input of the multiplexer 14' to perform this same function in much less time. Although there is one additional gate associated with the invention, software use is significantly reduced. Since software overhead is a significant factor in the overall performance of a logic device this hardware change is insignificant compared to the reduction of software use.

Figure 5:
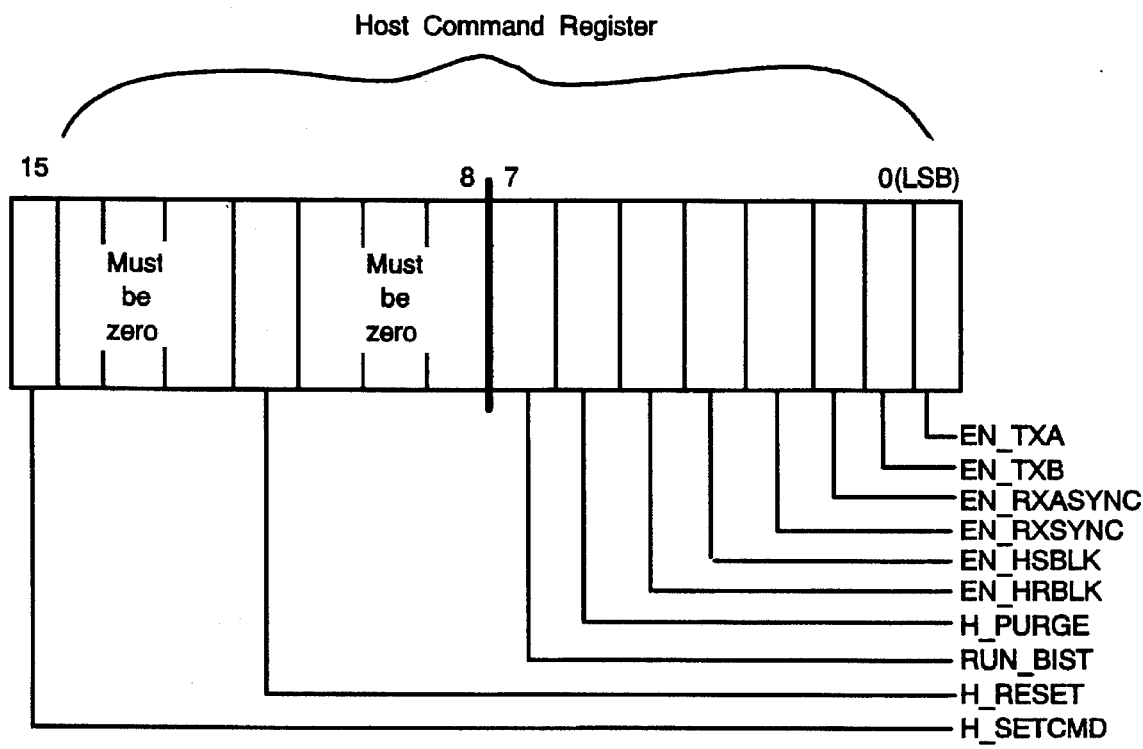
FIG. 5 is a block representation of a command register in accordance with the present invention.

In one embodiment, a Host Command register in accordance with the present invention is shown in a block representation as a 16-bit writable and readable register in FIG. 5. The values written to this register are bit significant commands that cause the hardware to perform various actions. The most significant bit of this register indicates to the hardware whether the desired command is to set or reset a command bit. When the most significant command bit is one, the: commands represented by the other bits that are set in the command word will be set. When the most significant bit is zero, the commands represented by the other bits that are set in the command word will be reset. Multiple commands may be set or reset in a single command word. Command bits (bits other than the most significant bit) that are zero in the command word are not affected.

It has been shown that through a small change in the hardware of a command register, a significant performance advantage can be obtained in a data logic device by reducing the software overhead associated with the device. Accordingly, by defining a mask bit and command bit in a register and allowing them to determine if bits must be changed the software use is significantly reduced, particularly when these registers are utilized in a cascade arrangement.

Although the present invention has been described in accordance with the embodiments shown in the figures, one of ordinary skill in the art will recognize there could be variations to those embodiments and those variations would be within the spirit and scope of the present invention. Accordingly, many modifications may be made by one of ordinary skill in the art without departing from the spirit and scope of the present invention.

What is claimed is:

1. An apparatus for modifying the contents of a register, the register having at least one register bit, each register bit having an input terminal and an output terminal, each register bit having a logic high state and a logic low state, the apparatus comprising:

a host command register means having a plurality of bits, at least one of the plurality of bits for providing a command bit signal;

at least one multiplexer means, each multiplexer means coupled to the host command register means and having a first input terminal coupled to receive the command bit, the command bit having a logic state equal to a new logic state for the register bits being modified, a second input terminal coupled to the output terminal of the at least one register bit for receiving the logic state of the at least one register bit, a control terminal, and an output terminal coupled to the input terminal of the at least one register bit; and at least one logic means, each logic means having a first input terminal for receiving a plurality of mask bits, each mask bit identifying if the at least one register bit is to be modified to the new logic state, and an output terminal coupled to the control terminal of the multiplexer means for controlling the multiplexer means so that if the at least one register bit is identified by the mask bit as one that is to be modified to the new logic state, the output of the multiplexer will modify the at least one register bit to the new logic state as determined by the logic state of the command bit.

2. The apparatus as recited in claim 1, wherein each logic means further comprises a second input terminal for receiving a register select signal.

3. The apparatus as recited in claim 1, wherein the register bit further comprises a D-type flip-flop.

4. An apparatus for modifying the contents of a register, the register having at least one register bit, each register bit having an input terminal and an output terminal, each register bit having a logic high state and a logic low state, the apparatus comprising:

a host command register means having a plurality of bits, a most significant bit of the plurality of bits providing a command bit signal;

at least one multiplexer means, each multiplexer means coupled to the host command register means, and having a first input terminal coupled to receive the command bit, the command bit having a logic state equal to a new logic state for the register bits being modified, a second input terminal coupled to the output terminal of the at least one register bit for receiving the logic state of the at least one register bit, a control terminal, and an output terminal coupled to the input terminal of the at least one register bit; and at least one logic means, each logic means having a first input terminal for receiving at least one mask bit, each mask bit identifying if the at least one register bit is to be modified to the new logic state, a second input terminal for receiving a register select signal, and an output terminal coupled to the control terminal of the multiplexer means for controlling the multiplexer means so that if the at least one register bit is identified by the mask bit as one that is to be modified to the new logic state, the output of the multiplexer will modify the at least one register bit to the new logic state as determined by the logic state of the command bit.

5. A method for modifying the contents of a register, the register having at least one register bit, each register bit having a logic high state and a logic low state, the method comprising the steps of:

(a) creating a mask of the register bits that are to be modified to a new logic state;

(b) creating a command bit as a most significant bit of a plurality of bits in a host command register means, the command bit having a logic state equal to that of the new logic state; and (c) writing the logic state of the command bit to the masked register bits so that the masked register bits are modified to the new logic state.

* * * * *